July 5, 1927.
W. DZIUBA ET AL
1,635,119
UTENSIL LIFTER
Filed June 30, 1926
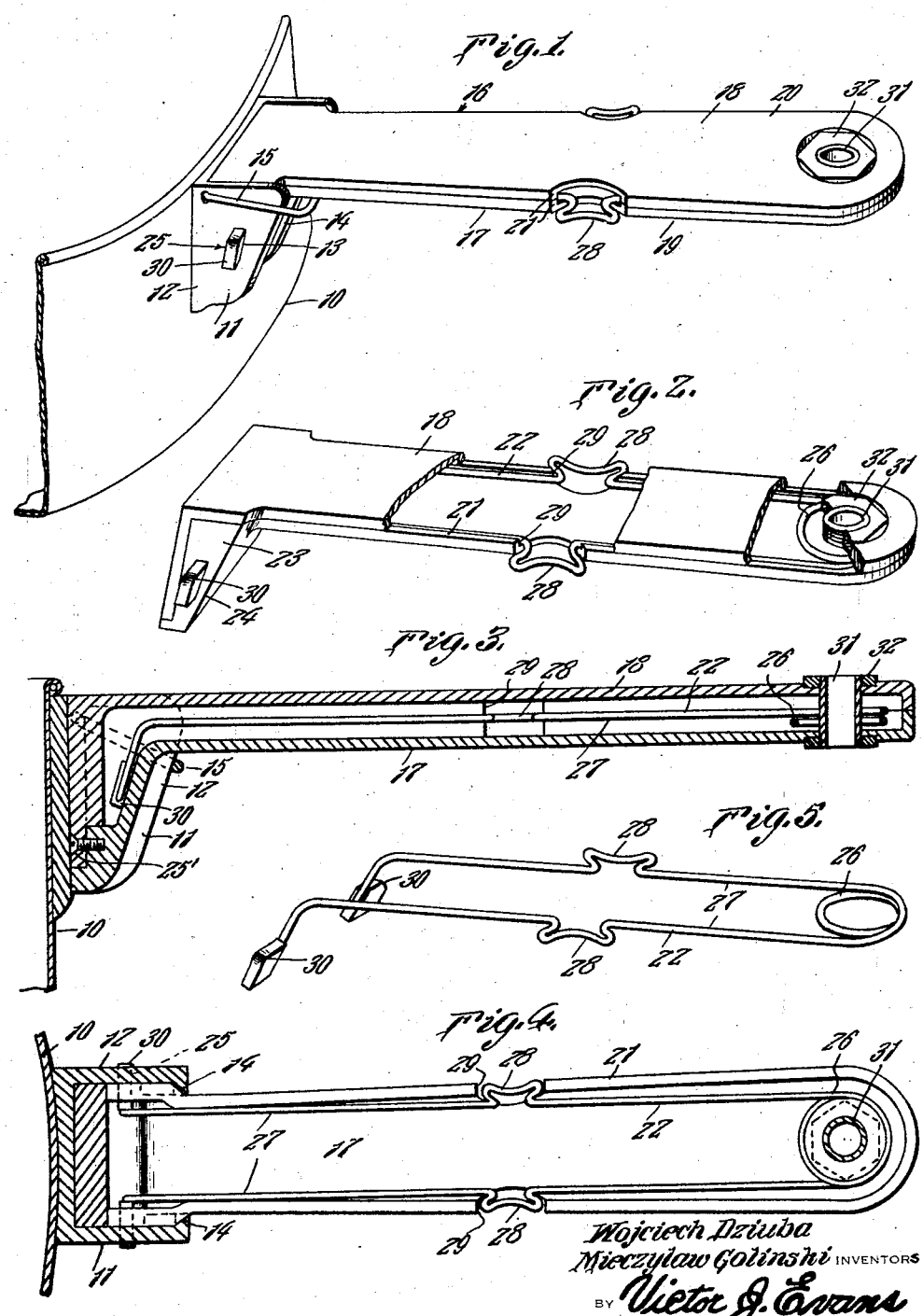
Wojciech Dziuba
Mieczyslaw Golinski INVENTORS
BY Victor J. Evans
ATTORNEY Patented July 5, 1927.

1,635,119

UNITED STATES PATENT OFFICE.

WOJCIECH DZIUBA AND MIECZYSLAW GOLINSKI, OF BAYONNE, NEW JERSEY.

UTENSIL LIFTER.

Application filed June 30, 1926. Serial No. 119,681.

This invention relates to improvements in utensil lifters, and has for its primary object, the provision of a removable handle for cooking utensils whereby the handle may be separated from the utensil when the same is upon a stove to make room for other cooking utensils, as it will be appreciated that a projecting handle often interferes with the arrangement of other utensils upon a stove as it prevents the placing of the same directly over the burners.

Another object of the invention resides in a utensil lifter capable of quick attachment to a cooking utensil for lifting the same to or from a stove, and for ready removal therefrom after the utensil has been placed upon the stove, whereby the lifter or handle is kept in a cool condition, it being understood that a utensil handle quickly heats up when permanently attached to the utensil.

A further object of the invention is to provide a utensil lifter which is simple in construction, easy of quick attachment to or removal from a utensil and capable of being operated by one hand of a user.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of a portion of a cooking utensil with our improved lifter in position thereon.

Figure 2 is a similar view of the lifter removed from the utensil with parts broken away in section.

Figure 3 is a vertical longitudinal sectional view on the line 3—3 of Figure 1.

Figure 4 is a horizontal sectional view on the line 4—4 of Figure 1.

Figure 5 is a detail perspective view of the latch member.

Referring more particularly to the drawing, the reference numeral 10 designates a cooking utensil having a socket or bracket member riveted or otherwise mounted on the side wall thereof. The member 11 comprises opposed side walls 12 having oppositely disposed elongated slots 13 therein. Flanges 14 extend inwardly from the side walls 12 and are inclined from the top of the bracket toward the bottom thereof to provide a seat for a purpose to be presently described. A bail 15 is pivoted in the side walls 12 and serves as a means for hanging the utensil from a nail or hook when not in use.

Our improved utensil lifter is shown in its entirety as at 16 and includes a pair of separable elongated sections 17 and 18. The sections respectively comprise handle portions 19 and 20, having meeting flanges 21 whereby to provide a hollow handle for housing a latch or lock member 22 therein. The handle portion 19 carries a head 23 having an inclined face 24 for co-action with the seat provided by the inclined flanges 14 on the bracket. Slots 25 open through the sides of the head, while an angularly disposed arm 25' extends from the handle portion 20 and overlies the front of the head.

The latch member 22 above referred to is constructed of a single length of spring wire, bent midway between its ends to provide a coil 26 and a pair of normally outwardly extending arms 27, which arms are provided with finger manipulating portions 28 bent therefrom. The manipulating portions 28 are exposed at the sides of the lifter through slots 29 provided in the handle portions 19 and 20. The free ends of the arms are bent at an angle to extend within the head 23 and carry outwardly extending lugs 30 which pass through the slots 25, but which lugs may be retracted into the head by pressing inwardly on the manipulating portions 28 to compress the arms 27.

For holding the two sections 17 and 18 in engagement with each other, and for anchoring the latch member therein, we provide a bolt 31 having a tubular shank and which passes through the outer end of the section and through the coil 26 in the latch member. A nut 32 co-acts with the threaded end of the shank for holding the sections clamped together. Both the head of the bolt and the nut are counter-sunk within the sections to lie flush with the outer faces thereof. By having the bolt hollow, it is possible to hang the lifter upon a nail or hook when not in use.

From the foregoing description, it will be seen that when it is desired to place a utensil upon a stove, or remove the same therefrom, the lifter is grasped by the hand of a user, and the arms 27 of the latch member are compressed, which causes the lugs 30 to be retracted within the head. The head is then inserted into the bracket 11 until the inclined face 24 is in seating engagement with the inclined flanges 14, whereupon pressure on the latch member is released, and by reason of the normal tendency of the arms to expand, the same will cause the lugs to be expanded beyond the sides of the head and into the slots 13 in the bracket. The slots 13 and 25 are automatically brought into register upon the limit of insertion of the head in the socket member, by reason of the section 17 abutting the top of the inwardly extending flanges 14. When the lugs are snapped into the slots 14, the lifter is securely attached to the utensil and cannot be disengaged therefrom until the arms are again compressed to retract the lugs.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. In combination with a utensil having a socket thereon and provided with aligned slots in the opposed walls thereof, an inclined seat in said socket, a lifter element comprising a hollow elongated handle, a resilient member enclosed within said handle, a head on one end of said handle and having an inclined face for co-action with the inclined seat in said socket, yieldable latch bolts extending outwardly from opposite sides of said resilient member and extending into said slots, and finger pieces on said resilient member extending through slots in opposite sides of said handle for manually retracting said latch bolts from said slots for facilitating the removal of said lifter element from said utensil.

2. A utensil lifter comprising a hollow elongated handle, a head formed on one end of said handle, a resilient member enclosed within said handle, oppositely disposed latch bolts extending from the free ends of said resilient member and normally projecting from the side of said head, and slots provided in said handle for exposing a portion of said resilient member to permit of the manual compression of the same to retract said latch bolts within said head.

3. A utensil lifter comprising a pair of co-acting handle sections, a latch member formed of a single piece of relatively springy wire bent to provide a coil and a pair of resilient arms, latch bolts extending outwardly from the free ends of arms, said latch member interposed between said sections, a fastening element passing through said sections adjacent the outer end thereof and through said coil, and slots provided in the sides of said sections for exposing a portion of said arms to permit of the manual compression of the same to retract said latch bolts against the spring action of said arms.

In testimony whereof we have affixed our signatures.

WOJCIECH DZIUBA.
MIECZYSLAW GOLINSKI.